Aug. 14, 1956  K. A. KLINGLER  2,758,894
JOURNAL LUBRICATING SYSTEM
Filed June 10, 1953  5 Sheets-Sheet 1

Inventor
Karl A. Klingler
by Parker & Carter
Attorneys

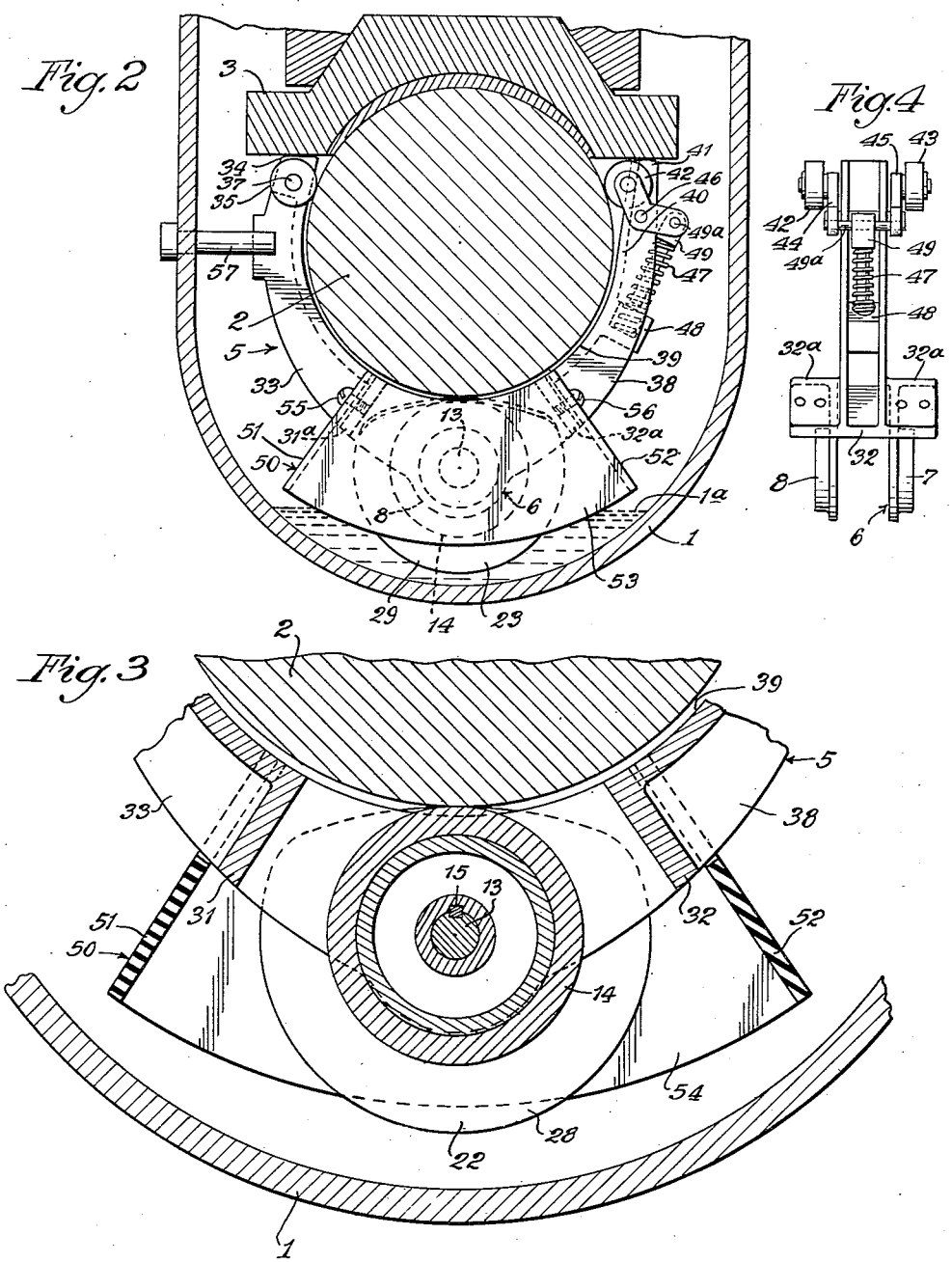

Aug. 14, 1956     K. A. KLINGLER     2,758,894
JOURNAL LUBRICATING SYSTEM
Filed June 10, 1953     5 Sheets-Sheet 3
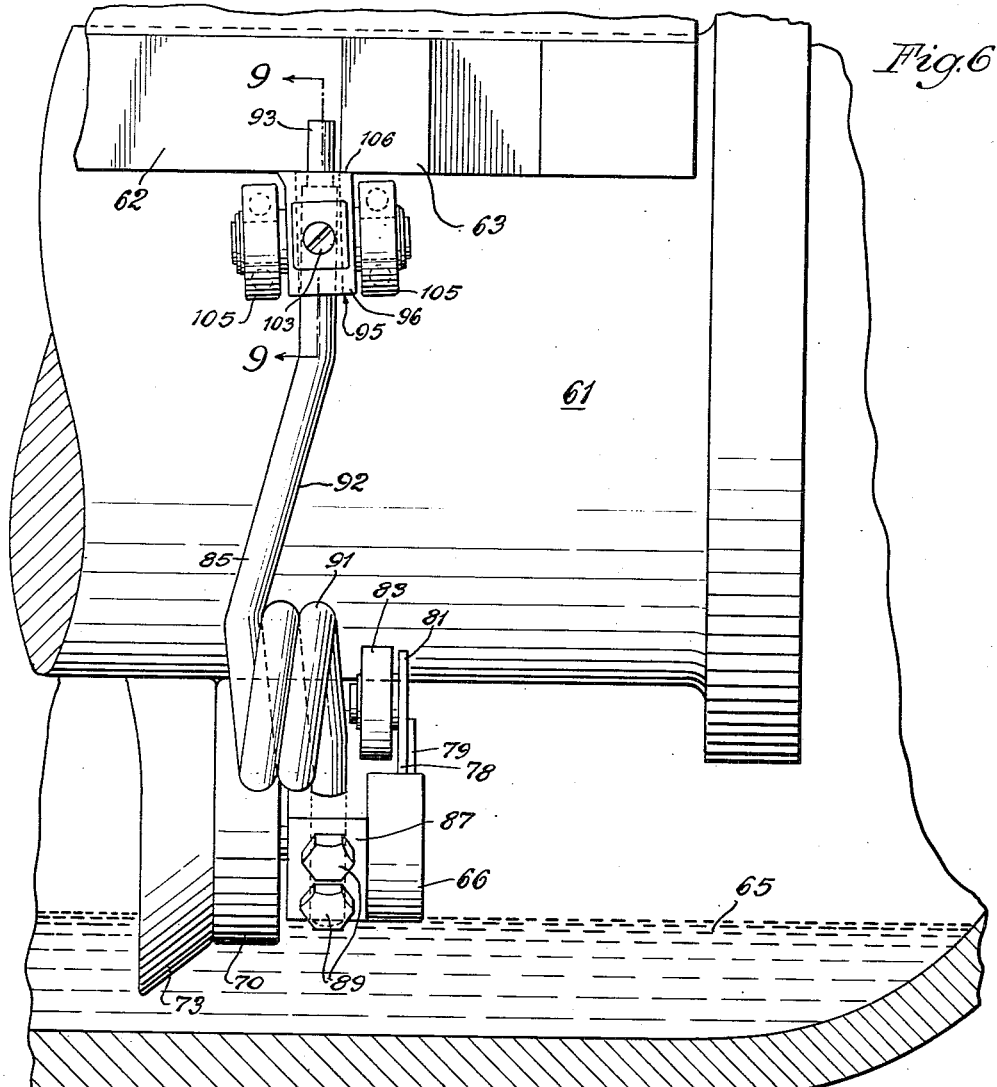
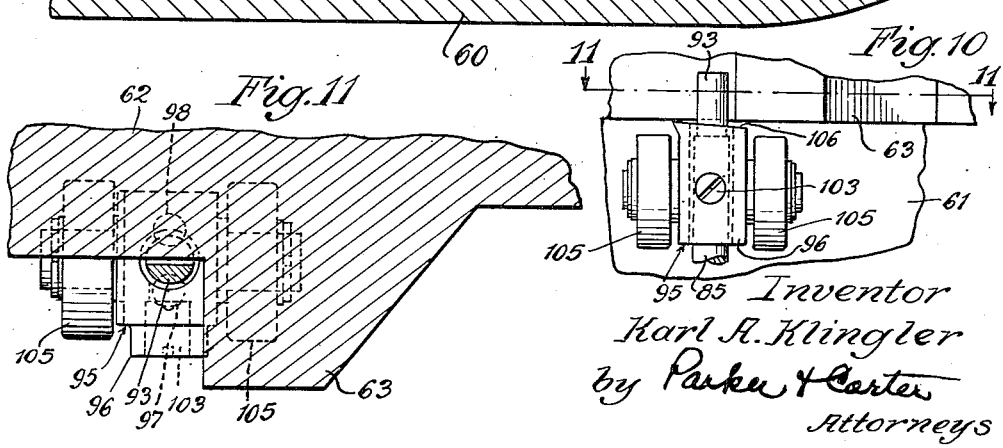

Aug. 14, 1956   K. A. KLINGLER   2,758,894
JOURNAL LUBRICATING SYSTEM
Filed June 10, 1953   5 Sheets-Sheet 4
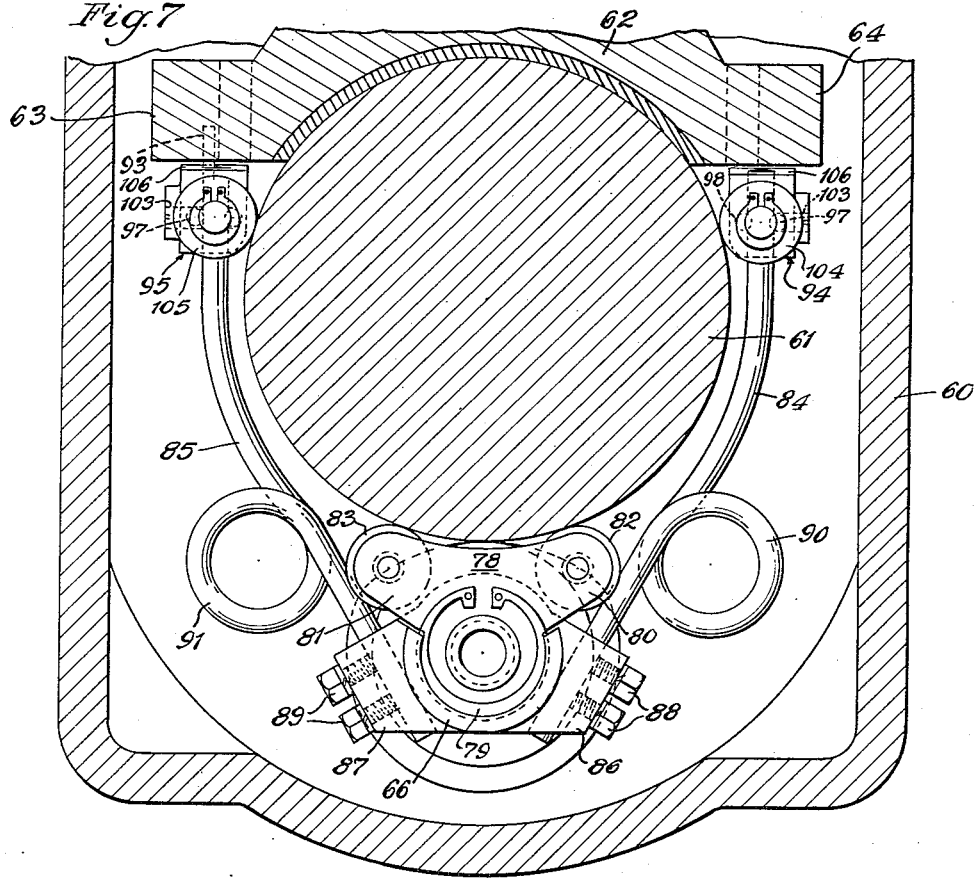
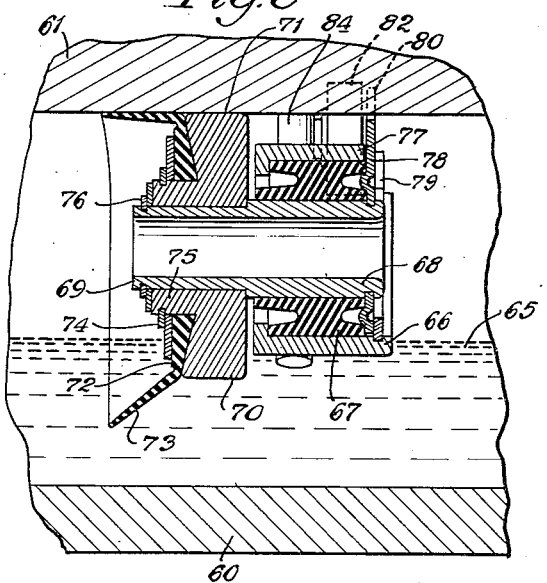
Inventor
Karl A. Klingler
by Parker & Carter
Attorneys

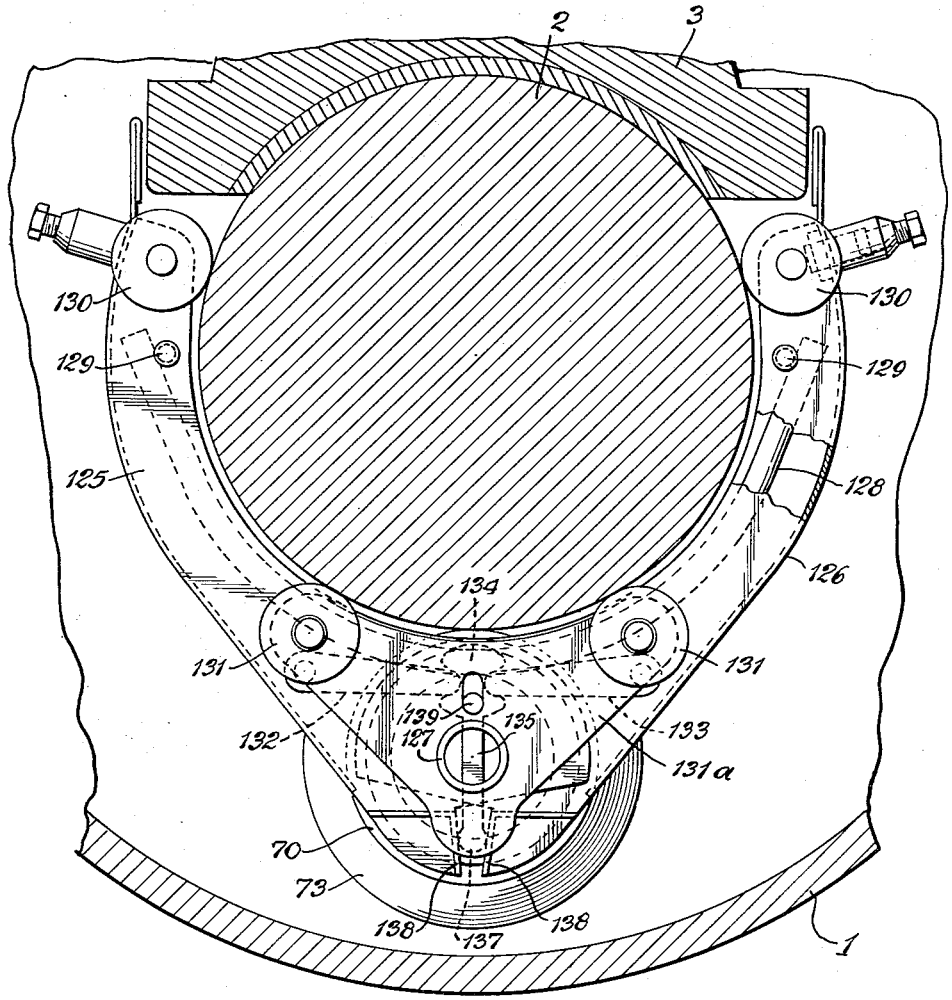

United States Patent Office 2,758,894
Patented Aug. 14, 1956

2,758,894

JOURNAL LUBRICATING SYSTEM

Karl A. Klingler, Naperville, Ill.

Application June 10, 1953, Serial No. 360,741

13 Claims. (Cl. 308—90)

This invention relates to lubricant distributing systems for axles. The invention specifically relates to an improved lubricating system for use with a conventional railroad journal box and journal assembly which is provided with a lubricant reservoir for the journal in the lower portion of the journal box.

According to my invention, I propose to eliminate the use of waste or other analogous material which is customarily employed to distribute lubricant on the journal during rotation of the journal and utilize, in place thereof, a pool of lubricant in a lubricant reservoir in the journal box and a lubricant distributor which carries lubricant from the reservoir and distributes it along the surface of the journal.

A principal object of my invention is to provide a lubricant distributor for the journal which can be unitarily attached to and removed from the journal without modification of the journal or journal box proper.

Another object of my invention is the provision of an improved lubricant distributor which is associated with a journal and journal box in such a manner as to insure the proper distribution of a thin film of lubricant on the journal.

Another object of my invention is the provision of a lubricant distributing device which is carried by the journal and conveys lubricant from a lubricant reservoir to the journal.

A further object of this invention is the provision of a lubricant distributing device which is carried by the journal and is self-positioning with respect to the journal and lubricant reservoir carried by the journal box.

A further object of this invention is the provision of a lubricant distributor which is carried by the journal and is responsive to rotation of the journal for distributing a thin film of lubricant on the surface of the journal.

Another object of this invention is the provision of a lubricant distributing device which is adapted for attachment to a variety of sizes of journals.

Other objects will appear from time to time in the course of the ensuing specification and claims. Referring generally now to the drawings:

Fig. 2 is an end elevational view of the assembly shown in Fig. 1 with certain portions of the journal box and journal being shown in section for purposes of clarity;

Fig. 3 is a sectional view of the attachment shown in Fig. 1 taken along the section lines 3—3 of Fig. 1;

Fig. 4 is a detailed view of a portion of the attachment shown in Fig. 2;

Fig. 6 is an assembly view showing another embodiment of lubricant distributing attachment in position on a customary journal;

Fig. 7 is an end elevational view of the device shown in Fig. 6;

Fig. 8 is an enlarged sectional view of the lubricant distributor and journal shown in Fig. 6;

Fig. 9 is an enlarged sectional view of the lubricant attachment positioning elements taken along the lines 9—9 of Fig. 6;

Fig. 10 is a detailed view of the lubricant attachment positioning elements shown in Fig. 6, but showing another operative position of these elements;

Fig. 11 is a sectional view of the positioning elements shown in Fig. 10 taken along the lines 11—11 of Fig. 10; and Fig. 12 is a view similar to Fig. 2 showing a modified form of the element riding on the car journal.

Like elements are designated by like characters throughout the specification and drawings.

Figure 1:
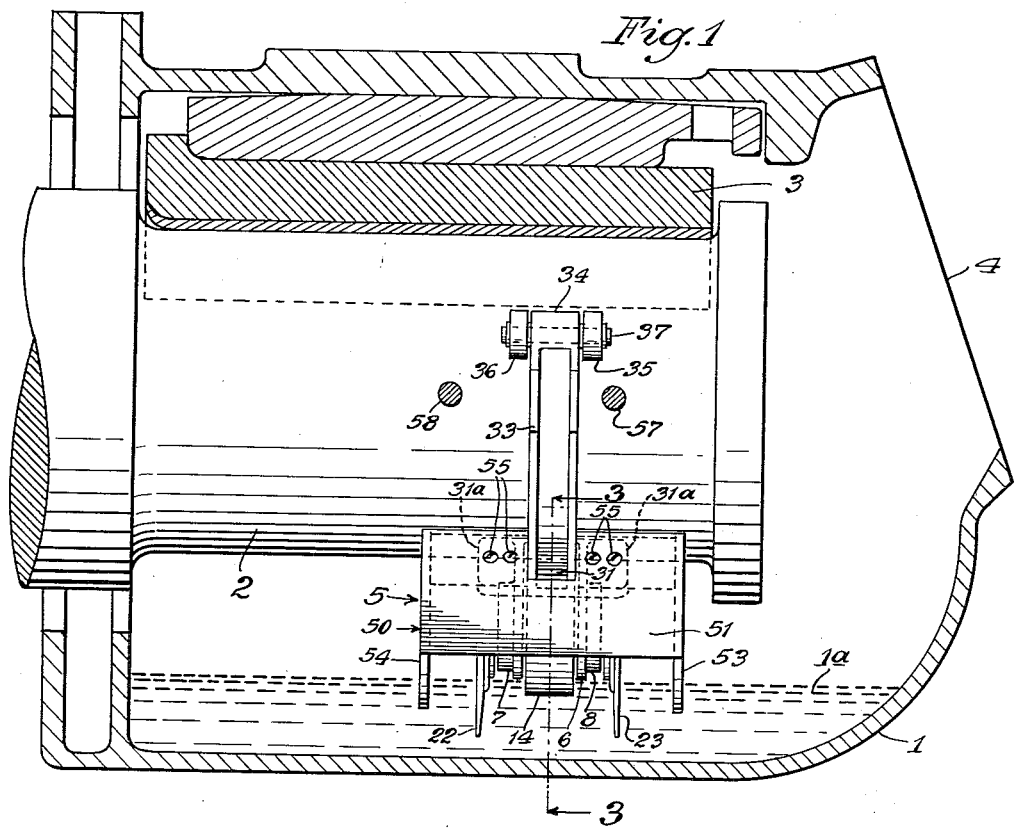
Fig. 1 is an assembly view showing one embodiment of lubricant distributing attachment in position in a conventional journal box and journal assembly.

Referring specifically now to the drawings and in the first instance to Fig. 1, 1 represents a conventional journal box having associated therewith conventional journal 2. 3 is the brass against which the journal bears. Journal box 1 is provided with the usual access opening 4 in the outer end of the journal box. The lower portion of the journal box 1 serves as a lubricant reservoir for a pool of lubricant 1a. 5 designates generally a lubricant distributing device which is constructed and applied in accordance with the principles of one embodiment of the invention.

Figure 5:
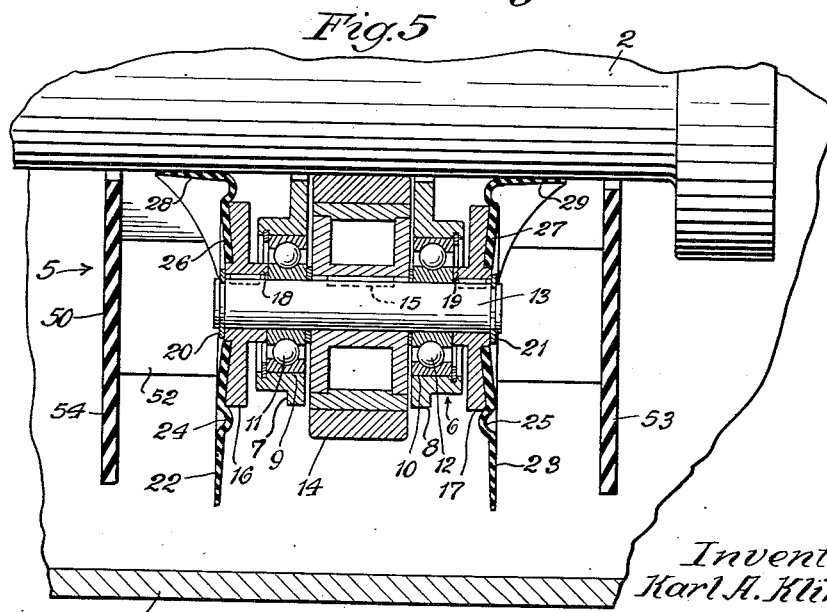
Fig. 5 is an enlarged sectional showing of the lubricant distributor and journal shown in Fig. 1.

The device includes a supporting member 6 in the form of a pair of spaced parallel members 7 and 8, as will be seen best in Figs. 4 and 5. The side members of this support have one surface formed as an arc about the center of journal 2 so that the support may be positioned closely adjacent the journal. Each side member 7 and 8 is provided with a bore 9 and 10, respectively, which are aligned with one another and support any suitable bearings 11 and 12 supporting a shaft 13. Shaft 13 extends beyond each side member 7 and 8, as will be apparent in Fig. 5, for supporting lubricant distributing members, which will be described more fully in ensuing portions of this specification. A roller member 14 is keyed or otherwise secured to shaft 13, as at 15, and is of a width sufficient to substantially fill the space between the side members 7 and 8. The radius of roller 14 is slightly greater than the distance from the center of shaft 13 to the journal facing arcuate surfaces of the side members 7 and 8. Roller 14 is thus adapted for continuous contact with the journal 2 while holding the side members 7 and 8 of the support at a slight distance from the surface of the journal. Suitably secured to each outer end of the shaft 13 is a backing member 16 and 17. As shown, these backing members are keyed to the shaft 13 and have inwardly extending hub portions 18 and 19, respectively, in abutting contact with the inner races of the bearings 11 and 12, respectively. The backing members 16 and 17 are held against outward movement on shaft 13 by means of any suitable snap rings 20 and 21 associated with shaft 13.

The backing members 16 and 17 carry lubricant distributing members 22 and 23. Each distributor is formed of rubber or any other suitable material. Each of the distributors is generally disk-shaped and has a radius substantially greater than the radius of the roller 14 or the distance from the axis of shaft 13 to the adjacent surface of the journal 2. The radius of these distributors is also sufficient to permit the extension of the distributors 22, 23 throughout a substantial depth of the lubricant reservoir in the journal box. Each distributor has a generally circularly extending depression 24 and 25 having a radius slightly less than the distance from the shaft 13 to the adjacent surface of the journal 2, thus defining an inner surface 26 and 27 adjacent the backing members and a peripheral outer surface 28 and 29 extending beyond the backing members. The distributors 22 and 23 are so proportioned that when the roller 14 is in contact with the surface of the journal, as seen best in Fig. 5, the portions of the outer surfaces 28 and 29, which are adjacent the surface of the journal 2, will be bent outwardly with respect to the support 6, thus providing lubricating surfaces in intimate contact with the surface of the journal.

When the support 6 is positioned adjacent the lower surface of the journal 2, as shown in Figs. 1 through 5, inclusive, and the roller 14 is in contact with the lower surface of the journal 2, rotation of the journal 2 in either direction will rotate the distributors 22 and 23, thus moving the distributors 22 and 23 through the lubricant in the lubricant reservoir and into contact with the surface of the journal. Portions of the outer surfaces 28 and 29 of the distributors are always in intimate contact with the surface of the journal. In other words, these outer surfaces dip into the pool of lubricant during the lower portion of their travel and carry lubricant particles to the surface of the journal 2, where distribution of a film of lubricant on the surface of the journal occurs.

The side members 7 and 8 are connected at their respective ends by cross members 31 and 32 formed integrally therewith. Each of the cross members 31 and 32 is provided with laterally extending ears 31a and 32a, which are utilized for a purpose to be pointed out in ensuing portions of this specification. An arm 33 is formed integrally with the cross member 31 and extends in the form of an arc struck about the axis of journal 2 as a center and terminates at its outer end 34 adjacent the brass 3. Arm 33, together with the support 6, is adapted to extend through a distance greater than one fourth of the periphery of the journal to which the attachment is applied. A pair of rollers 35 and 36 are journaled adjacent the end of arm 33 on any suitable axle 37 so as to contact the surface of the journal 2 and maintain the arm 33 and support 6 spaced from the surface of the journal. Another arm 38 is formed integrally with the cross member 32 and is adapted to extend around the opposite side of the journal 2. Arm 38 includes an arcuate portion 39 struck about the axis of journal 2, as a center, and a generally straight portion 40 which extends tangentially to the curvilinear portion 38 at a point diametrically opposite to the rollers 35 and 36. Arm 38, together with support 6, extends through a distance greater than one fourth of the periphery of the journal 2. Arm 38 terminates at its outer end 41 at a point adjacent the other side of the brass 3. A pair of rollers 42 and 43, as will be seen best in Fig. 4, are carried on levers 44 and 45 pivotally connected to the arm portion 40, as at 46. A spring member 47 has one end portion seated in a spring seat 48 formed on the arm 38 and another end portion bearing against a spring-retaining member 49 connected to the lever 44 and 45 through a cross pin 49a so as to continually bias the rollers 42 and 43 toward journal-engaging position.

In their normal position the rollers carried by the arms 33 and 38 are spaced apart a distance less than the diameter of journal 2 and the spring member 47 allows the rollers 42 and 43 to yield or move away from the rollers 35 and 36 to a position where the rollers are spaced apart a distance at least equal to the diameter of the journal 2.

A skirt member or shield of rubber, or any other suitable flexible substance, is designated generally at 50. The skirt or shield 50 includes spaced converging side portions 51 and 52 which extend generally parallel to the axis of the shaft 13, and end portions 53 and 54 extending transversely thereto. The shield is attached to the ears 31a and 32a, as by means of any suitable bolts or the like 55 and 56. The skirt or shield member 50 serves to confine lubricant to a generally localized area on the surface of journal 2.

I provide means for limiting the axial displacement of the attachment along the journal 2. A pair of stop members 57 and 58 are inserted through the wall of the journal box, as will be apparent in Fig. 2, and allow a relatively small degree of movement of the attachment along the journal 2.

When utilizing the attachment a pool of lubricant is maintained in the lower portion of the box 1, as indicated at 1a. The attachment is inserted through the access opening 4 in the journal box 1 and moved to the position shown in Fig. 1, wherein the arms 33 and 38 embrace the journal 2 and, together with the roller 14, hold the attachment in lubricating position. The attachment is such as to provide a three-point engagement with the journal 2. The resilient engagement of the rollers 42 and 43 with the journal 2 insures a snug fit of the attachment with relation to the journal.

Rotation of the roller 14 rotates the distributors 23 so as to distribute a film of lubricant through the outer surfaces on the distributors to the surface of the journal. Lubricant distributed on the surface of the journal by the distributing surfaces 28 and 29 is worked along the entire bearing surface of the journal by the action of the brass 3 with the surface of the journal. A vary important aspect of the invention resides in the fact that the distributors spread this film of lubricant on the journal 2 at a variety of depths of lubricant within the reservoir. As long as the lower portions of the distributors 22 and 23 move through lubricant in the reservoir, lubricant particles will be distributed on the surface of the journal. Thus it is possible to provide proper lubrication for the journal when the lubricant it as a very low level in the reservoir as distinguished from conventional journal lubricating systems. The distributors are proportioned so that they create a minimum of resistance in moving through the lubricant while at the same time they spread lubricant on the surface of the journal.

In Figs. 6 through 11, inclusive, I have illustrated another embodiment of the invention. In these figures 60 represents the journal box, 61 the journal and 62 the brass provided with customary ears or protruding members 63 and 64. A pool of lubricant 65 is maintained in the lower portion of the journal box 60. In this embodiment a support member 66, provided with a generally cylindrical bore, is adapted to be positioned adjacent the journal 61 and pool of lubricant 65. A resilient packing member 67, generally cylindrical in form, is disposed within the support 66. A stub shaft 68 is supported by the member 66 and packing member 67 and has a reduced portion 69 extending outwardly from the support 66. The backing member 70, in the general form of a roller, is journaled for rotation on shaft 69 and is adapted for rolling contact with the journal 61, as at 71. Backing member 70 carries the lubricant distributor 72 which is generally disk-shaped and has a generally peripherally extending outer surface 73 extending at an angle to the remainder of the distributor body. Any suitable snap ring 74 on a hub 75 of the roller 70 may be employed to hold the distributor 72 in position with relation to the roller member 70. A suitable snap ring 76 on the reduced portion 69 of the stub shaft holds the distributor and roller against axial displacement with relation to the shaft.

The distributor 72 is formed of rubber, or any other equivalent material, so as to permit flexure of the outer portion 73 of the distributor with relation to the roller 70. The over-all diameter of the distributor 72 is substantially greater than the diameter of the roller 70 so that when the roller 70 contacts the journal 61 and rotates therewith, the outer portion 73 of the distributor is bent inwardly with relation to the shaft 68 along the surface of the journal 61. The support 66, roller 70 and distributor 72 are proportioned so that the distributor extends into the lubricant in the journal box and distributes a film of lubricant along the surface of the journal during rotation of the roller 70 and distributor 72.

The support 66 has an upper portion thereof cut away, as at 77, for the reception of a generally triangularly-shaped roller-supporting plate 78 fitted onto the shaft 68. One surface of the plate 78 bears against the resilient member 67. A snap ring 79 is carried by the support 66, as will be seen best in Fig. 8, and serves to hold the plate 78 against the resilient member 67. The plate 78 includes a pair of spaced arm portions 80 and 81. A roller member 82 is journaled on the arm portion 80 and a roller member 83 is journaled on the arm portion 81. The rollers 82 and 83 together with the roller member 70 form a three-point bearing engagement with the surface of the journal so as to insure parallelism between the shaft 69 and journal 61.

A pair of journal-embracing arms 84 and 85 extend from the support 66 and are adapted to hold the support 66 and distributor 73 in lubricating position. In this embodiment, the arms are formed of any suitable resilient metal, such as spring steel, and have their lower end portions carried in bores formed in members 86 and 87 extending laterally from the support 66. The arms are held in position by any suitable setscrews 88 and 89. Each of the arms 84 and 85 is provided with a coiled portion 90 and 91 intermediate the ends of the arms. The portion of each arm extending upwardly from the coiled portion is bent towards the axis of the lower portion of the arm, as at 92 in Fig. 6, in order to maintain the upper portion of each arm generally parallel with the lower portion of each arm. Arm 84 terminates adjacent the portion 64 of the brass, while the arm 85 terminates in a reduced end portion 93 extending above the lower surface of the brass. Each arm 84 and 85 carries a roller assembly 94 and 95 at their upper ends. As will be seen best in Fig. 9, each roller assembly includes a roller-carrying member 96 slidably received by the arm. Each roller-carrying member is pivotally connected to the arms by means of opposed balls 97 and 98 bearing against depressions 99 and 100 in the arm and depression 101 in the member 96 and a depression 102 in an adjusting member 103 threadably disposed in the member 96 and aligned with the depression 101. Whereas the roller-carrying members 96 are shown as pivotally connected to the arms 85 by means of the ball bearing members 97 and 98, other forms of pivotal connection may be employed. For example, if desired, a pivot pin may extend through the member 96 and arm 85 to hold the member 96 in its proper position.

Each of the assemblies 94 and 95 include rollers 104 and 105, respectively, journaled in any suitable fashion on the supporting member. Each of the rollers is adapted for contact with the surface of the journal 61. Each arm 84 and 85 has a normal configuration such that the rollers 104 and 105 are spaced apart a distance less than the diameter of the journal 61. The resiliency of the arms 84 and 85 permit a yielding expansion of the arms to a position where the rollers are spaced apart a distance at least equal to the diameter of the journal 61. Thus, when it is desired to apply the lubricating device to the journal, the arms are simply forced apart against the resiliency of the arms to a position allowing the attachment to be moved into lubricating position. In the lubricating position, which is shown best in Fig. 7, the rollers 104 and 105, 82 and 83, and 70 provide supporting engagement with the journal 61 at spaced points of the greater portion of the periphery of the journal.

Means are provided for holding the attachment against axial displacement along the axis of the journal 61. Each roller-carrying member 96 is provided with an upper surface 106 which is inclined at a small angle to the axis of the rollers and downwardly toward the end face of the journal, as will be seen best in Figs. 6 and 10. In actual practice, an inclination on the order of 3 degrees has been found to be practical. When the journal 61 rotates in either direction, the frictional resistance of the roller members of the attachment to the rotation of the journal 61 will rotate the attachment in either a clockwise direction or counterclockwise direction about the axis of the journal, depending upon the axis of rotation of the journal. The attachment will rotate to a point where the inclined surface 106 on the roller-carrying member 66 contacts the lateral extending portion 63 or 64 of the brass. Rotation of the attachment forces the roller-carrying member 96 to tilt about its axis by virtue of the inclination of the surface 106, thus creating a tilt to the rollers carried by the member 96. This tilting of the rollers creates a component force tending to move the attachment towards the outer end face of the journal. Movement in this direction is limited by contact of the reduced portion 93 on the arm 85 with the laterally extending portion 63 of the brass or a fixed portion of the journal box. In other words, the tilting of the rollers carried by the arms forces the attachment outwardly to a point where movement is limited by the reduced portion 93 on the arm.

In Figs. 6 through 11, inclusive, the rollers are shown as having a normal position with their axes generally parallel to the axis of the journal. If desired, each of the roller-carrying members may be spring biased so as to give them a slight inclination in their normal positions (out of contact with the brass) which is opposite to their inclination when the members contact the brass. This tends to increase the force components for shifting the attachment outwardly with respect to the journal.

Thus, the attachment is self-positioning. That is to say, it maintains its position on the journal without the aid of an operator or attendant.

In either direction of rotation of the journal, the roller assemblies force the attachment outwardly with respect to the journal.

It will be apparent that, if desired, any suitable skirt member or shield may be employed with the lubricant distributor shown in Figs. 6 through 11, inclusive, in a manner analogous to the employment of the skirt member or shield member 50, shown in Figs. 1 through 5, inclusive.

In the embodiment of Figs. 6 through 11, inclusive, the attachment is adaptable for different sizes of journals. For example, the arms 84 and 85 may be adjusted to a variety of positions by displacing the lower portions of the arms within the bores of the support and appropriately tightening the set screws 88 and 89.

Another embodiment of the invention (not shown in the drawings) provides a pair of channel-shaped journal embracing arms hingedly connected to a lubricant distributing member support, as shown in Fig. 1, or Fig. 6, at a point generally coaxial with the axis of rotation of the distributors. In this embodiment rollers similar to those shown in Fig. 6 are carried by the arms. The arms are biased toward one another by a coil spring encircling the support and having opposite ends connected in any suitable manner to the arms for biasing the arms toward one another, thus providing for ready removal of the attachment from the journal while also providing firm engagement of the attachment with the journal.

In operation, the embodiment shown in Figs. 6 through 11 is similar to the operation of the embodiment of the invention shown in Figs. 1 through 5, inclusive. The attachment is simply inserted through the access opening in the journal box and snapped into journal-embracing position. The lubricant distributing member 72 serves to pick up particles of lubricant from the reservoir at a variety of depths of the lubricant in the reservoir and spread a lubricant film on the surface of the journal.

In all of the embodiments shown and described, the journal embracing arms hold the attachment in position on the journal. In each, the resilient mounting of the rollers creates force components pulling the distributor and support carried roller into snug engagement with the surface of the journal. The arrangement is such as to insure a firm engagement of all the rollers and distributor with the surface of the journal.

In each form of the invention shown and described, the attachment can be utilized without modifying the journal box. Thus it is possible to replace conventional lubricating systems by merely slipping the attachment of the instant invention into place on the journal. The attachment is simply inserted through the access opening in the box and snapped into position on the journal. Once on the journal proper, the attachment takes care of itself. The attachment is self-aligning and maintains its lubricant distributing position.

Referring to Fig. 12, the arms 125, 126 which encircle a portion of the axle are pivoted at 127. The spring 128 engages at each end pins 129 in the arms 125, 126 respectively and is wrapped around the pivot of the two arms so that the spring tends to hold the rollers 130 snugly against the journal above the horizontal plane thereof. The rollers 131 carried on the yoke 131a on pivot 127 engage the journal below the horizontal plane so that the two arms when drawn together about the journal, are limited in up and down movement by contact of the four rollers with the journal. Thrust links 132, 133 are pivoted respectively on the arms 125, 126 and their free ends engage the traveling head 134. This traveling head includes a downwardly extending thrust arm 135 passing slidably through pivot 127 terminating in an enlarged head 137 which is thrust between lock surfaces 138 on the two opposed arms. By this arrangement, the thrust members 132, 133 permit the spring 128 to hold the rollers against the journal and the presence of the locking head 137 prevents opening of the arms such as would cause disengagement from the journal. When it is desired to disengage the lubricating member from the journal, the head 134 is moved upwardly a sufficient distance to cause the head 137 to permit rotation of the arms so that the spring 128 can be easily overcome and the arms opened for removal. Pin 139 extends through a slot in yoke 131a to permit manipulation of the head 134.

In Figure 6 I have shown the rollers 105 mounted to rotate about an axis very slightly inclined to the axis of the journal. I happen to have shown them for convenience inclined in a direction which tends to move the lubricator toward the shoulder at the inboard end of the journal. If the extension 93 were omitted, the lubricator would travel over until it contacted the shoulder of the axle and would stay there. It might be necessary under some circumstances to provide some member projecting from the spring arm 92 to engage the shoulder so as to keep the element 66 from contacting the shoulder.

I have also used the axle engaging holding rollers 105 as the means for providing the thrust to move the lubricator in the direction of the shoulder. If desired, separate rollers might be used, under which circumstances the rollers 105 would be on axes parallel with the axis of the journal.

Whereas I have shown and described operative forms of my invention, I wish it to be understood that this showing is to be taken in an illustrative or diagrammatic sense and not in any limiting sense. There are modifications of the invention which will fall within the scope of the invention which will be apparent to those skilled in the art. For example, if desired, roller assemblies, as shown in Figs. 6 through 11, may be utilized on the journal embracing arms in the embodiment of Figs. 1 through 5, in lieu of the assemblies there shown. The scope of the invention, therefore, should be limited only by the scope of the hereinafter appended claims.

I claim:

1. A lubricating device for use with a railroad journal box and journal assembly provided with a lubricant reservoir in the box including a support adapted to be positioned adjacent the journal, a flexible lubricant distributor rotatably mounted on said support, a pair of journal embracing arms joined to said support, each arm having a member adapted for contact with said journal, a member carried by said support and adapted for contact with said journal, said support-carried member and arm-carried members being spaced to provide a three point suspension for the distributor and support from the journal.

2. A lubricating attachment for use with a railroad journal box and journal assembly provided with a lubricant reservoir in the box including a support adapted to be positioned adjacent the journal, a flexible lubricant distributor rotatably mounted on said support, a pair of journal embracing arms joined to said support, each arm having a member adapted for contact with said journal, a member carried by said support and adapted for contact with said journal, said support-carried member and arm-carried members being spaced to provide a three point suspension for the distributor and support from the journal, and means for limiting axial displacement of the attachment with respect to the journal.

3. A lubricating attachment as recited in claim 2 wherein said means includes a member on the attachment adapted for contact with a relatively fixed member on the journal box.

4. A lubricating attachment as recited in claim 1 characterized by and including means for adjusting the effective length of the arms with respect to the support and journal.

5. A lubricating attachment as recited in claim 1 wherein a shield is provided for confining lubricant to a predetermined area on said journal.

6. A lubricant distributing attachment for use with a railroad journal box and journal assembly provided with a lubricant reservoir in the lower portion of the box including a support adapted to be positioned adjacent the journal, a lubricant distributing member mounted on said support and adapted to spread a film of lubricant on said journal, a pair of journal embracing arms having members adapted for contact with said journal said arms extending from said support and adapted to hold said support and member in lubricant distributing position by suspension from the journal, and means adapted in response to rotation of the attachment about the axis of the journal for shifting the attachment along the journal in a predetermined direction.

7. A lubricant distributing attachment for use with a railroad journal box and journal assembly provided with a lubricant reservoir in the lower portion of the box including a support adapted to be positioned adjacent the journal, a lubricant distributing member mounted on said support and adapted to spread a film of lubricant on said journal, a pair of journal embracing arms having members adapted for contact with said journal, said arms extending from said support and adapted to hold said support and member in lubricant distributing position by suspension from the journal, means adapted in response to rotation of the attachment about the axis of the journal for shifting the attachment along the journal in a predetermined direction, and stop means for limiting the shifting of the attachment in said direction.

8. A lubricant distributing attachment for use with a railroad journal box and journal assembly provided with a lubricant reservoir in the lower portion of the box including a support adapted to be positioned adjacent the journal, a lubricant distributing member mounted on said support and adapted to spread a film of lubricant on said journal, a pair of journal embracing arms having members adapted for contact with said journal, said arms extending from said support and adapted to hold said support and member in lubricant distributing position by suspension from the journal, and cam means adapted in response to rotation of the attachment about the axis of the journal for shifting the attachment along the journal in a predetermined direction.

9. A lubricant distributing attachment for use with a railroad journal box and journal assembly provided with a lubricant reservoir in the lower portion of the box including a support adapted to be positioned adjacent the journal, a lubricant distributing member mounted on said support and adapted to spread a film of lubricant on said journal, a pair of journal embracing arms having members adapted for contact with said journal, said arms extending from said support and adapted to hold said support and member in lubricant distributing position by suspension from the journal, and means adapted in response to rotation of the journal for tilting one of the arm-carried members to create a force component tending to shift the attachment along the axis of the journal.

10. A lubricant distributing attachment for use with a railroad journal box and journal assembly provided with a lubricant reservoir in the lower portion of the box including a support adapted to be positioned adjacent the journal, a lubricant distributing member mounted on said support and adapted to spread a film of lubricant on said journal, a pair of journal embracing arms having members adapted for contact with said journal, said arms extending from said support and adapted to hold said support and member in lubricant distributing position by suspension from the journal, and means adapted in response to rotation of the journal for tilting one of the arm-carried members to create a force component tending to shift the attachment along the axis of the journal, said means including a camming surface carried with one of said members and adapted upon contact with a relatively fixed portion of the journal box to tilt the member.

11. A lubricant distributing device for use with a railroad journal box and journal assembly provided with a lubricant reservoir in the lower portion of the box including a support adapted to be positioned adjacent the journal, a lubricant distributing member movably mounted on said support, said member having a surface adapted to move through said lubricant reservoir and into contact with said journal, and a pair of journal embracing arms extending from said support and adapted to hold said support and member in lubricant distributing position by suspension from the journal, and means for locking the embracing arms in journal engaging position.

12. A lubricant distributing device for use with a railroad journal box and journal assembly provided with a lubricant reservoir in the lower portion of the box including a support out of contact with the journal box adapted to hang from the journal, a lubricant distributing member movably mounted on said support, said member having a surface adapted to move through said lubricant reservoir and into contact with said journal, and a pair of journal embracing arms extending upwardly from said support, terminating above a horizontal plane containing the axis of the journal and contacting the journal above such plane whereby said support and member are held in lubricant distributing position by suspension from the journal and means for yieldingly biasing the embracing arms in journal engaging position.

13. A lubricant distributing device for use with a railroad journal box and journal assembly provided with a lubricant reservoir in the lower portion of the box including a support adapted to be positioned adjacent the journal, a lubricant distributing member movably mounted on said support, said member having a surface adapted to move through said lubricant reservoir and into contact with said journal, and a pair of journal embracing arms extending from said support and adapted to hold said support and member in lubricant distributing position by suspension from the journal and means for yieldingly biasing the embracing arms and means for locking them in journal engaging position.

References Cited in the file of this patent

UNITED STATES PATENTS

| 118,691 | Collins | Sept. 5, 1871 |
| 564,856 | Weber | July 28, 1896 |
| 801,300 | Conradson | Oct. 10, 1905 |
| 1,888,080 | Hennessy | Nov. 15, 1932 |

FOREIGN PATENTS

| 335,953 | Germany | Apr. 26, 1921 |